United States Patent [19]

Winter

[11] Patent Number: 4,558,934
[45] Date of Patent: Dec. 17, 1985

[54] CAMERA EXPOSURE CONTROL SYSTEM
[75] Inventor: Arthur J. Winter, Encino, Calif.
[73] Assignee: W. Haking Enterprises Limited, Hong Kong, Hong Kong
[21] Appl. No.: 652,081
[22] Filed: Sep. 20, 1984
[51] Int. Cl.⁴ .............................................. G03B 7/00
[52] U.S. Cl. ..................................................... 354/21
[58] Field of Search ............................................ 354/21
[56] References Cited

U.S. PATENT DOCUMENTS 4,200,371  4/1980  Suzuki et al. ........................ 354/21
4,431,283  2/1984  Hoda et al. .......................... 354/21

FOREIGN PATENT DOCUMENTS 0091440  12/1982  Japan .................................. 354/21

Primary Examiner—Russell E. Adams
Attorney, Agent, or Firm—Stephen R. Arnold; Russell E. Hattis

[57] ABSTRACT

A film speed correction circuit for electrically controlled cameras having aperture or shutter speed controlled responsively to ambient light sensings from a photosensor features a controllable multi-stage amplifier preferably interposed between the photosensor and the aperture or shutter control means. The amplifier features a plurality of cascaded stages, each stage being operated to two different gain values according to a sensing signal provided thereto, the sensing signals for each stage being derived from coded insulating and conducting areas on the outer surface of the film cassette. Use of active stages interposed between passive attenuating stages substantially eliminates interstage loading and allows the use of standard resistance values to provided proper gain values for each stage.

21 Claims, 6 Drawing Figures

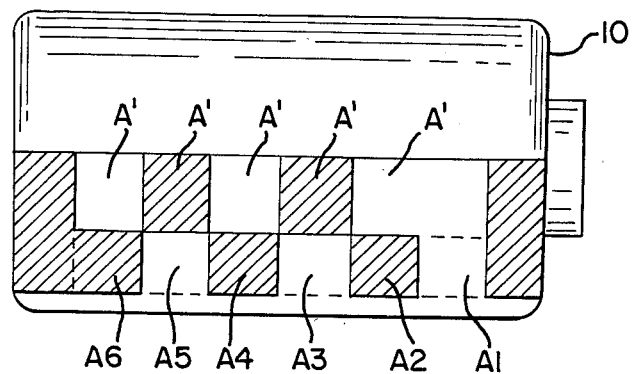
FIG_1_
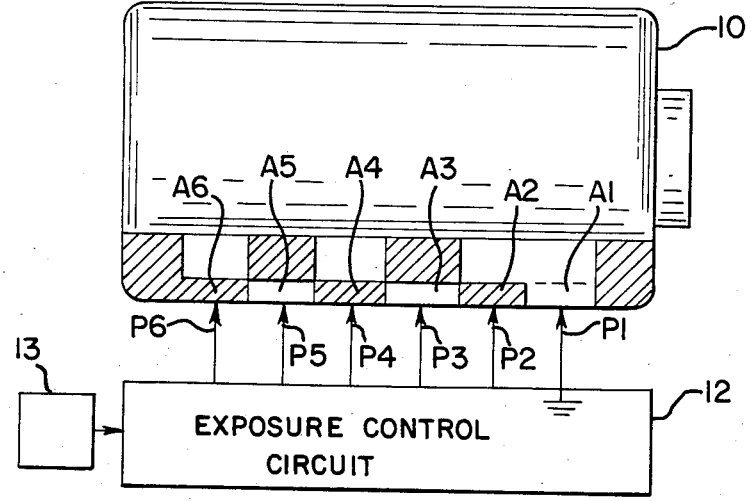
FIG_2_
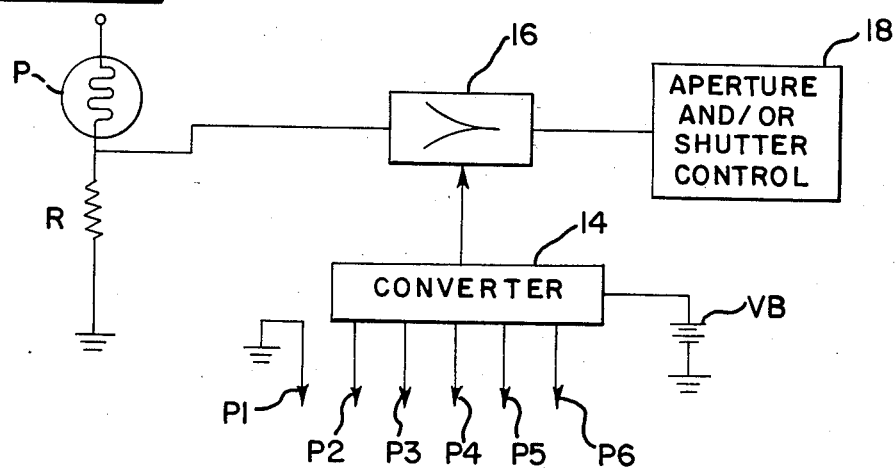
FIG_3_

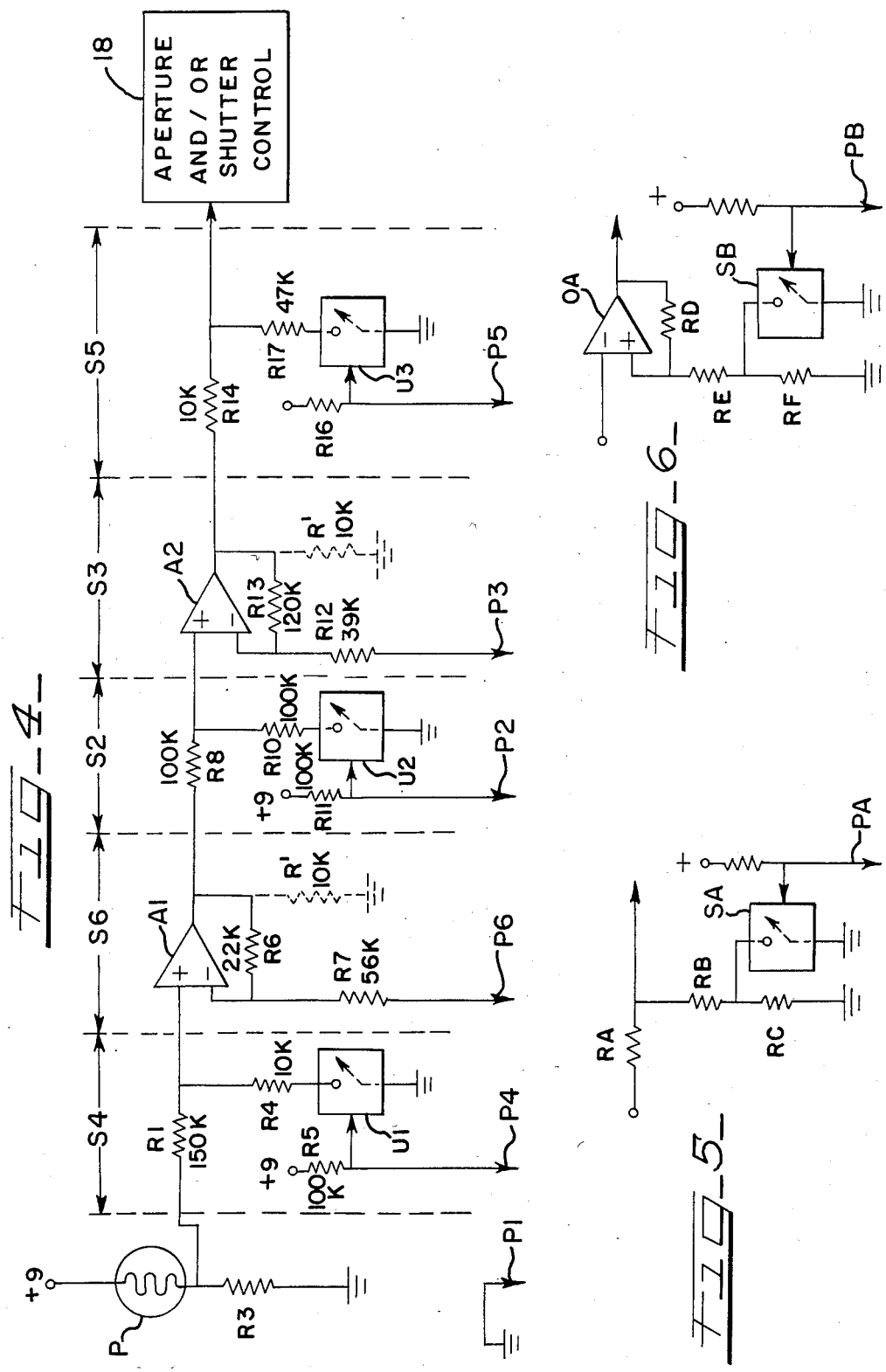

CAMERA EXPOSURE CONTROL SYSTEM

TECHNICAL FIELD OF THE INVENTION

The technical field of the invention is the electrically controlled still camera art, and in particular electronic control of exposure according to ambient light sensings.

BACKGROUND OF THE INVENTION

There has been recently released on the commercial market by the Eastman-Kodak Company a new form of 35 mm film cartridge (Trademark "DX") provided with means whereby the speed of the film within is indicated on the outer surface of the cassette by a five-digit coded pattern of dark insulating and bright conductive areas thereon. The insulating areas area coated on a common conducting area on the cartridge so that the exposed conductive areas become code sensing areas. There are thus five possible conductive sensing areas employed to yield a representation of the film speed, represented by the arrangement of insulating areas.

The purpose of this film coding system is to allow control of camera exposure for a given ambient lighting condition as detected by photosensor means in the camera so as to set the correct value of aperture, shutter speed, or both according to the film speed as indicated by the pattern of insulating markings on the cartridge. The applicant is aware that experimental systems have been demonstrated wherein electrical contact to the speed-defining pattern is made by electrical probes making pressure contact to these speed-indicating sensing areas, these probe sensings in turn being communicated to a microprocessor unit using a table-look-up program to establish an exposure control signal according to the precise filmspeed value. It would be a useful feature in a camera if the same function could be provided from such sensings without requiring a microprocessor so as to reduce the cost of the camera.

SUMMARY OF THE INVENTION

One aspect of the invention results from the applicant's discovery that this 5-bit Kodak code can be mathematically treated to give a useful approximation of the actual film speed values. By assigning various pairs of fixed values to the two sensed conditions of each code bit and by multiplying these values together, a number results which is closely proportional to the actual film speed represented by the code. The multiplication is most advantageously carried out in a camera exposure control system by analogue (non-digital) means. The pairs of values assigned to the various code bits are in general different from one another, although some or all may share one value in common. It may further be shown that the film speed can be roughly approximated with an error of a factor two at most using only two sensing areas and suitably assigned pair values.

In accordance with one preferred form of the invention, a controllable amplifier is used to provide film speed-responsive exposure-controlling signals, each stage having its gain controllable between two preset values representative of a pair of the code bit values just referred to according to the sensing condition (conducting or nonconducting) detected by its associated individual sensing probe. Each probe is configured to contact a different code bit sensing area on the Kodak film speed coded cartridge. By configuring the amplifier preferably as a series of five controllable stages, the output of each stage feeding the input of the net, the overall amplifier gain is thus the product of the gain values of the five individual stages. Each stage has its individual gain-value pair weighted to correspond to the speed-indicating approximation developed by the applicant. As applied to the exemplary form of the invention, the overall gain of the amplifier is thus controlled to be reasonably closely proportional to the true film speed indicated by a given speed-indicating code pattern on the film cartridge.

In the preferred form of the invention the light-responsive output from an ambient light sensing photocell is fed to the input of the controllable amplifier system to produce a signal which is used to control the aperture setting, the shutter speed, or both of the same. While this version of the invention is to be preferred, as is discussed in the Description of Invention, an alternative form of the invention may be used wherein a similar controllable amplifier system is employed to amplify the signal from a constant voltage reference source and the signal proportional to the output of the light sensing produced may be introduced into any suitable point in or at the output of the amplified system to provide the ultimate desired exposure control signal.

In the preferred form of the invention optimum isolation of interstage loading and proper signal margins are provided by arranging the amplifier system to have three passive (non-amplifying) controllable resistive attenuators separated by active amplifying controllable gain amplifiers, all stages having their gains operable between different preset values depending on the probe sensing conditions. In this respect, the term "gain" or "gain state" is to be broadly construed as the ratio of output to input signal level, and "gain" may therefore be greater than or less than unity.

According to a specific related feature of the invention, the applicant has found that a normalized form of the filmspeed approximation allows the sensing circuitry to be simplified by setting one of the weighted values corresponding to one of the sensing conditions of each probe equal to unity. This reduces the number of parts and thus the cost of the individual amplifier stages. For similar reasons, passive attenuators, when used, are operable between a "gain" of unity and a value less than unity. In the exemplary form of the invention to be described, this aspect of the invention requires only two (rather than three) resistors per stage to set both gain values, and standard RTMA resistance values may be used in all stages.

Other advantages and features of the invnetion will become apparent upon making reference to the description to follow, the drawings, and the claims.

DESCRIPTION OF DRAWINGS

FIG. 1 is a side view of an Eastman-Kodak DX (Trademark) cassette having markings thereon denoting, among other things, the speed of the film contained within.

FIG. 2 is a view of the same cassette as in FIG. 1, and further showing in symbolic form electrical conductivity sensing probes placed in contact with the film speed-indicating sensing areas on the cassette and communicating area sensing information to an exposure control circuit of general form having an ambient light photosensing means associated therewith.

FIG. 3 is a block schematic version of one embodiment of the present invention showing a converter used to provide a control signal to a nonlinear element so as to control passage of an ambient light sensing signal to an aperture/shutter control system.

FIG. 4 is an electrical schematic circuit of the exemplary form of the present invention wherein such an ambient light sensing signal is passed through five stages, each stage being operated between two different output to input ("gain") ratios, according to the sensings received from the sensing area probe contacts of FIG. 2.

FIG. 5 shows an alternative version of a controllable attenuator stage for the circuit of FIG. 4.

FIG. 6 shows an alternative version of a controllable amplifier stage for the circuit of FIG. 4.

DETAILED DESCRIPTION OF THE INVENTION

FIG. 1 shows a representative Eastman-Kodak Company DX (Trademark) cassette having a single overall conducting region having predesignated sensing areas A2–A6 thereon, areas A2, A4 and A6 thereof being covered for the particular cassette shown by an electrically insulating film. The choice of which particular areas are covered by insulation constitutes a representation of the speed of the film contained within the cassette. A sensing area A1 (never insulated) is the exposed portion of this conductive region. Additional information, e.g. number of exposures (12, 24, 36), is represented by additional similarly coded sensing areas A'.

FIG. 2 shows the cassette 10 of FIG. 1 positioned for speed sensing measurement by means of probes P1–P6, here symbolically shown contacting areas A1–A6, and coupled with separate inputs of a general exposure control circuit 12 used to control the shutter speed, aperture, or both, of an electrically operated camera having ambien light photosensing means 13 having an associated photosensor P.

With respect to the decoding of the film speed from the state of the sensing areas A2–A6 as sensed by electrical contact between probe P1, touching common area A1, and the conduction probes P2–P6, Table I shows in tabular form the arrangement of markings corresponding to each film speed. Thus, it will be noted that a film speed of 25 is indicated by the presence of insulating coatings on areas A2, A3, A4, and A6, and a bare metallic conducting area A5, yielding a conducting sensing between probe P5 contacting area A5 and probe P1 contacting the area A1. Similarly, for example, a film speed of 50 is represented by the presence of conducting areas A2 and A5, and nonconducting areas A3, A4, and A6.

The applicant has found that all of the film speeds indicated by the configurations indicated in Table I may be closely approximated by a product of five terms or weight factors, each weight factor representing the condition (conducting/nonconducting) of a different sensing area, each weight factor taking one of two preset values according to the condition of its associated sensing area.

It will be seen in Table I that the approximate film speeds computed from the different probe sensing conditions closely approximate those of the corresponding Kodak code when the product of the different weight factors represented by the sensing of conductive or non-conductive area by each probe is obtained and then multiplied by 850. The pairs of weight factors for each of the sensing areas are indicated in the bottom row of Table I. If the particular area involved is conducting, as indicated in Table I by the presence of a "C", then the weight factor for this area is taken to be the larger of its associated pair. Thus, for example, a film speed of 25, indicated by a conducting sensing in area A5 only, yields the multiplicative product 0.50×1.00×0.063×1.00×1.00. After multiplying this product by the prefactor 850, the numerical value so achieved, 27, is entered in the column in Table I entitled "Computed Speed". Similar calculations are entered for all other speeds. It will be noted that relative closeness of the computed speed and the true film speed indicated in the left hand column of Table I is sufficient for virtually any photographic purpose.

With respect to the pairs of weight factors associated with each sensing area as shown in Table I, these are optimum pair values, as will be shown. It should be recognized that an infinite number of such pair values are possible, provided that the multiplicative prefactor is suitably adjusted. Thus, for example, if each of the weight factors were to be doubled, i.e. the factors for area A2 taking the values 1.00 or 2.00, those for A3 taking the values 8.00 or 2.00, etc., the computation would again yield the proper film speed, provided that the prefactor is suitably adjusted. In this case it would take a value of approximately 27. What is most significant is that, irrespective of the prefactor and its corresponding pairs of weight values, the same weight value will occur in each of the pairs, i.e. 1.00 for prefactor 850, 2.00 for prefactor 27, etc. As will shortly become evident, the fact that the approximation is such that one weight value for each stage may be set equal to unity permits a simplification in the design of the exposure controller of the present invention.

In the exemplary form of the invention, shown by the circuit of FIG. 4, a string of five controllable gain stages S1–S5 apply the weight factors of Table I (approximated by standard RTMA resistance values) to an ambient light indicating photosensing signal derived from a current from the positive supply passed through a photosensor P and a series signal-sensing resistor R3. The resulting signal is passed to input resistor R1 of input stage S4. Each stage is controllably actuated between two "gain" conditions corresponding the appropriate weight factors for its associated sensing probe. Thus, for example, in the first stage S4, as will immediately be shown, a stage gain of unit (1.00) or alternatively a stage gain of 0.065 is achieved, according to whether or not its associated sensing electrode probe P4 senses a conducting or an insulating condition on its associated speed-indicating area A4 (FIGS. 1 and 2).

In more detail, stage S4 provides for attenuation via resistors R1 (150 kilohms) and R4 (10 kilohms) of 0.063 when the CMOS switch U1 (type 4106 manufactured by Texas Instruments Co., among others) is driven to a closed condition when its gate electrode is pulled high responsively to a nonconducting condition sensed at electrode P4. It will be noted that sensing electrode P1, invariably contacting the underlying conducting substrate via area A1, is here returned to system ground. Thus, a conducting sensing at any electrode P2–P6 gives rise to a short circuit condition to ground thereat.

With respect to stage S4 the gate electrode of CMOS switch U1 from +9 volts, fed throguh resistor R5 may be pulled from its normal positive value down to 0 volts upon a conducting sensing contact, thereby opening CMOS switch U1 so as to allow unattenuated passage of the signal from the photosensor P to the amplifier A1. As previously shown, if an insulating condition is sensed, switch U1 will be in the closed condition, grounding the lower end of resistor R4 so as to attenuate the input signal derived from the photosensor P to 0.063 times its value. Thus, the input to amplifier A1 of the next stage S6 is controllably varied between an attenuated and an unattenuated condition according to the sensing of probe P4. It will be noted that the "gain" of stage S4 is thus 1.00 when the associated sensing area S4 is conducting, and 0.063 when it is insulated, in accordance with the weight factors for this area (Table I).

Stage S6 consists of a feedback amplifier wherein a feedback resistor R6 of value 22 kilohms is returned to the non-inverting input, this input also being returned to sensing probe P6 via resistor R7 of value 56 kilohms. As is well known in the art, the overall gain of stage S6 under such conditions is given by the fraction (R7+R6)/R7, i.e. in this case 1.39, provided that probe P6 is at ground potential. This approximates the algorithmic higher weight factor of 1.41 (Table I), using standard RTMA resistance values. Release of probe P1 from ground gives rise to a unity gain condition. The output from the second stage S6 is then fed to a third attenuator stage S2 consisting of resistor R8 of value 100 kilohms connected at one end to the output of amplifier A1, and at the other end selectively to ground via CMOS switch U2 through resistor R10 of having a value 100 kilohms. As in stage S4, switch U2 is actuated to an open state when its associated probe P2 contacts a conducting area, thereby causing a no-loss passage of the output signal from amplifier A1 to the next stage S3, i.e. to the non-inverting input of amplifier A2 from the juncture between rsistors $8 and R10. When the probe contacts a conducting area the result is an attenuation factor of 0.50 (gain).

The next attenuator stage S3 is similar in configuration to stage S6; however, the value of the feedback resistor R13 is now 120 kilohms and the resistor R12 controllably provided by sensing probe P3 is assigned the value of 39 kilohms. With sensing probe P3 contacting a conducting area on the cassette, the overall stage gain is 4.00, and with the probe P3 floating, the desired unity gain is achieved. The output of stage S3 is connected to a passive attenuator having the same configuration as stages S4 and S2; however, here the input resistor R14 is assigned the value 10 kilohms and the controllably grounded resistor R17 is assigned the value 47 kilohms. This stage is thus similarly actuated, according to the sensing of its associated probe P5, between values of 0.83 and 1.00. Finally, the output signal is taken on line L1 between the juncture of resistors R14 and R17 to provide the suitably weighted photosensing signal derived from photosensor P to the aperture and/or shutter control unit 18.

It will be noted that the individual stage gains achieved by using standard RTMA values for the resistors yield values sufficiently close to the previously derived weight factors that the controllable stages shown in FIG. 4 may be expected to produce an overall amplifier gain which is controllable so as to have a value closely equal to the film speed as derived from speed-indicating area sensings. Thus, the above mentioned algorithm has been used to design an electrical control circuit which senses the status of the conducting state of the various speed-indiating areas and which produces a control signal condition to adjust the camera exposure control means according to film speed. Optional resistors R' of 10 kilohm value are used to load the outputs of amplifiers A1 and A2 to ground for purposes of amplifier stability. A representative amplifier for the present purposes would be the type LM324 made, for example, by National Semiconductor Co.

With respect to the embodiment shown in FIG. 4, the system depicted therein is designed such that increasing signal levels applied via line L1 to the aperture-shutter control 18 will cause a decrease in exposure. Thus, for a given film speed setting, i.e. for a given sensing configuration detected by probes P2-P6, a decrease in illuminantion level sensed by photosensor P will cause its resistance to rise, resulting in increased potential developed at the junction between it and resistor R3, resulting in a stronger output signal on line L1 to cause a decrease in the aperture opening, a shortening of the shutter exposure time, or both. Moreover, for a given illumination level sensed at photosensor P, use of a very high speed film, such as ASA 5000, would cause all probes P2-P6 to be grounded, thereby producing a maximum in signal level at line L1, resulting in substantial closure of the aperture or reduction of the shutter-open time. At the other extreme, use of ASA 25 film would result in the grounding only of sensing probe P5 (see Table I), resulting in substantial gain reduction, causing the voltage on line L1 to be substantially decreased, resulting in increased film exposure.

The particular arrangement of passive and active stages shown in FIG. 4 has been chosen to provide reasonable signal levels at various points within the system, and merely represents one arrangement out of a great many possible arrangements which could equally well be employed, according to the design constraints posed by a given system. One basic constraint which must be considered is that of keeping signal levels within the linear operating range of the amplifying stages as set by available supply voltage, while keeping that same signal well above the circuit noise level at all points. Also, the use of active stages S6 and S3 interposed between passive attenuating stages S4, S2, and S5 provides a particularly useful isolation feature between the passive stages, because such active stages are characterized by very high input impedance, and therefore have negligible reflected effect on the attenuation ratio of a preceding passive attenuator stage. Further, they provide for sufficiently low output impedance values that this output impedance does not play a substantial role in affecting the overall attenuation of a subsequent passive attenuator stage.

As previously indicated, to provide overall gain proportional to film speed, it is not the absolute gain values of each stage which is important, but the value of their individual gain ratios with respect to the other stages. Clearly, a great variety of individual stage gain ratios could be combined according to the principles set forth herein to achieve the same measure of control of the aperture of film speed according to sensings derived from the probes P2-P6.

Thus, FIG. 5 shows a representative 3-resistor circuit representing a passive attenuator switchable between two different "gain" values less than unity. Here an input series dropping resistor RA has the output end thereof loaded to ground alternatively by the combination RB+RC with switch SA acuated by a sensing from probe PA to an open condition, and alternatively to a second factor RA/RB when switch SA is closed. Here two different non-unity "gain" values are achieved at the expense of including an additional resistor RC in the network. Similarly, FIG. 6 shows a controllable operational amplifer stage operable between a pair of gain values, both of which are in excess of unity. The connection between the feedback resistor Rd and the non-inverting input of operational amplifier OA is connected to ground through the series string consisting of resistor RE in series with resistor RF. The lower resistor RF can be selectively shorted out of the circuit by switch SB resulting in overall stage gains given by (RD+RE+RF)/(RE+RF) or (RD+RE)/RE. It will be noted that this variant, as well as that of FIG. 5 requires the inclusion of an additional resistor, and thus represents not only increased component expense, but also the incremental labor cost associated with the incorporation thereof into the circuit. The fact that the speed-indicating approximation is normalizable so that one weight value for each stage can be normalized to unity permits the use of the simpler circuit shown in FIG. 4.

FIG. 3 shows as alternative version of the present system, wherein a converter 14, configured along the general lines of stages S2–S5 of FIG. 4 produces an output control signal to control a variable gain amplifier 16. Here, instead of passing the photosensing signal through the controllable amplifier 14, a fixed signal input derived from an external potential source VB is fed to the input of the converter 14 to provide a signal to the controllable amplifier 16 such that the output signal from the converter 14 is proportional to the film speed sensings. To the extent that the controllable gain amplifier 16 has adequate linear control range with respect to control signals over an amplitude range of 200 to one, i.e. film speed ranging from ASA 25 to ASA 5000, then signals similarly derived from a photosensor P and ballasting resistor R may be fed through such a controlled amplifier to provide to the aperture and/or shutter control 18 a signal control signal properaly weighted according to film speed. Because of the large range of photosensing signals and film speeds which must be accommodated, the amplifier 16 must exhibit provision for adequate noise margins and large signal excursions; hence the approach shown in FIG. 3 is considered to be less desirable than that indicated in FIG. 4.

Alternatively, the principles of the present invention could be applied so that the output of the converter 14 of FIG. 3 could be used to provide a film correction to the shutter speed alone, the photo sensing signal being dedicated soley to control of the aperture passing directly to its associated aperture control system without any modification whatever from the converter 14.

Thus, there has been described a generally inexpensive controllable amplifier whose overall gain value is governed in accordance with film speed sensings to provide a correction to an ambient light sensing signal so as to properly actuate aperture and/or shutter control systems over a range of film speeds. Interstage loading effects between individual passive attenuator stages have been effectively minimized by the interposition of active stages, this isolation greatly facilitating the use of standard RTMA resistance values to be used to control the attenuation of the various stages to the desired values.

It should also be recognized that, although the particular sensing system described herein employs conductivity sensing probes, alternative sensing systems could be employed, as for example optical sensings of the reflectivity of the associated speed-sensing areas A2–A6 of the cassette 10 (FIGS. 1–2). Suitable measures would have to be taken in such a case, however, to insure that the sensing system does not introduce voltage or impedance levels which interfere with securing the requisite gain ratio at each stage.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to a particular embodiment disclosed as the best mode contemplated for carrying out the invention, but that the invention will include all embodiments and equivalents falling within the scope of the general principles disclosed herein.

In particular, it is clear that for films of multi-stop latitude, the precision accorded by a five-probe sensing system may not be necessary, or even desirable, under certain cost restraints. Thus, with reference to sensing areas A3 and A4, it may readily be shown with reference to Table I that the film speed may be computed to an error no greater than a factor of two from only two code bit values, rather than five code bit values, from the conditions of the code bit areas A3 and A4, assigning them the value pairs 1.0/4.0 and 1.0/15 respectively, and applying a multiplication factor of 50. Here again, it will be noted that the common value 1.0 occurs in the two pairs of values. Thus, in this case an appropriate two-stage version of the circuit shown in FIG. 4 would simply have two cascaded amplifying stages similar to S6 and S3 and operable between unity gain value and gain values of 4.0 and 15 respectively according to the sensings of the two areas A3 and A4.

Also, while a binary code is clearly the preferred form of the invention, the broadest aspect thereof includes the use of code bits having three possible detecting conditions representing three different values if a suitable code were selected for this purpose. However, for the present, the invention is commercially useful only with the binary coded code.

TABLE I

| SPEED (ASA) | SENSING AREA AND SENSING (c = conducting) | | | | | INVENTION COMPUTED SPEED |
|---|---|---|---|---|---|---|
| | A2 | A3 | A4 | A5 | A6 | |
| 25 | | | | c | | 27 |
| 32 | | | | | c | 32 |
| 40 | | | | c | c | 38 |
| 50 | c | | | c | | 53 |
| 64 | c | | | | c | 63 |
| 80 | c | | | c | c | 75 |
| 100 | | c | | c | | 106 |
| 125 | | c | | | c | 126 |
| 160 | | c | | c | c | 150 |
| 200 | c | c | | c | | 213 |
| 250 | c | c | | | c | 253 |
| 320 | c | c | | c | c | 300 |
| 400 | | | c | c | | 425 |
| 500 | | | c | | c | 505 |
| 640 | | | c | c | c | 601 |
| 800 | c | | c | c | | 850 |
| 1000 | c | | c | | c | 1011 |
| 1250 | c | | c | c | c | 1202 |
| 1600 | | c | c | c | | 1700 |
| 2000 | | c | c | | c | 2022 |
| 2500 | | c | c | c | c | 2404 |
| 3200 | c | c | c | c | | 3400 |
| 4000 | c | c | c | | c | 4043 |
| 5000 | c | c | c | c | c | 4808 |
| WEIGHT: | 0.50 or | 4.00 or | .0625 or | 0.84 or | 1.41 or | |

TABLE I-continued

| SPEED (ASA) | SENSING AREA AND SENSING (c = conducting) | | | | | INVENTION COMPUTED SPEED |
|---|---|---|---|---|---|---|
| | A2 | A3 | A4 | A5 | A6 | |
| | 1.00 | 1.00 | 1.00 | 1.00 | 1.00 | |

Rule: A conducting area takes the larger value.

I claim:

1. In an electrically operated camera configured to acceptingly receive a film-dispensing cassette, said camera having scene illumination sensing means for providing electrical illumination-indicating signals indicative of scene illumination, exposure control means responsive to said electrical illumination-indicating signals for automatically adjusting camera exposure in accordance with the magnitude of scene illumination including film speed control means for controlling the operation said exposure control means by a film speed correction control signal related to the speed of the film contained within said cassette, said film speed bring represented by a code displayed on the surface of said cassette, said code taking the form of a plurality of specified areas, each said specified area being characterized by at least a first and a second speed-indicating condition, said plurality of specified areas collectively constituting a generally precise coded representation of the film speed, the improvement wherein:
said code has the property that a numerical value can be assigned to each speed-indicating condition of each of said specified areas so that the product of said assigned numerical values represented by the codes displayed on said cassettes yields values closely proportional to the actual film speed; and
said film speed control means for controlling said exposure control means includes a plurality of sensing means for sensing the speed-indicating condition of at least a lesser plurality of said specified areas and analogue multiplier means for controllably varying the magnitude of said film speed correction control signal by analogue multiplication thereof by the product of a corresponding at least a lesser plurality of numerical values, each said value being proportional to that assigned to the sensed speed-indicating conditions to give at least an approximate film speed correction to said exposure.

2. The camera of claim 1 wherein said multiplier means comprises a plurality of series connected analogue signal processing stages, each stage being controllably coupled to one of said sensing means, the last or output stage providing electrical exposure control signals to said exposure control means, each stage being controllably settable to a first output to input voltage ratio or stage gain state responsivley to a sensing of said first speed-indicating condition by its associated sensing means and to at least one different gain state responsively to a sensing of at least said second speed-indicating condition, each set of stage gain state values being chosen such that the output signal supplied to said exposure control means is at least approximately corrected according to said coded film speed.

3. The camera of claim 2 wherein at least one of said signal processing stages includes an amplifier having an inverse feedback network coupled thereto, said network being coupled to the associated sensing means for said at least one stage so that the gain state of said stage is controllably set at one of at least two different given values according to the sensing by variation of the feedback ratio.

4. The camera of claim 2 wherein at least one of said signal processing stages includes a passive non-amplifying signal attenuating network coupled to the associated sensing means for said at least one stage so that the signal attenuation of said stage is controllably settable to one of at least two different given values according to the sensing.

5. The camera of claim 3 wherein one of said given values is unity.

6. The camera of claim 5 wherein at least one other of said given values is greater than unity.

7. The camera of claim 4 wherein one of said given values is unity.

8. The camera of claim 7 wherein at least one other of said given values is less than unity.

9. The camera of claim 4 wherein there are provided at least three said signal processing stages and wherein at least two of said signal processing stages are configured as such attenuating networks, and at least one other of said signal processing stages is configured as an amplifier-containing stage interposedly connected between said at least two attenuating networks and providing isolation therebetween, said at least one amplifier-containing stage including an amplifier having an inverse feedback network coupled thereto, said feedback network being coupled to the associated sensing means for said at least one amplifying stage so that the gain state of said stage is controllably settable to one of at least two different given values according to the sensing by variation of the feedback ratio.

10. The camera of claims 1 or 2 wherein all of said plurality of said specified areas are sensed by said plurality of sensing means.

11. The camera of claims 1 or 2 wherein said code further has the property that the product of said assigned numerical values associated with a given lesser plurality of said sensing areas yields a value at least roughly proportional to the actual film speed, and wherein only said given lesser plurality of said specified areas are sensed by said plurality of sensing means.

12. The camera of claim 9 wherein said cassette has a total of five of said speed-indicating specified areas, each said specified area being characterized by only a first and a second speed-indicating condition, and said multiplier means includes five such controllable stages, each stage being controllably settable to one of only two gain state values according to a sensing condition produced by stage-associated sensing means which produce only two sensing conditions according to the sensing of a stage-associated one of said specified areas.

13. The camera of claim 12 wherein three of said stages are configured as such voltage attenuating networks each of which is operable between only two attenuation values and two of said stages are configured as such amplifying stages interposed in series between said voltage attenuating networks and operable between only two stage gain values.

14. The camera of claims 12 or 13 wherein each said controllable stage is operable to an output to input voltage ratio of unity responsively to one of the sensing states detected by each of said stage-associated sensing means.

15. The camera of claim 3 wherein at least one other of said stages includes a signal attenuating network coupled to the associated sensing means for said at least one other of said stages so that the attenuation of said at least one other of said stages is controllable settable to one of at least two different given values according to the sensing.

16. The camera of claim 15 wherein one of said amplifier gain state values is unity and one of said attenuation values is unity.

17. The camera of claim 1 wherein said electrical illumination-indicating signal is fed to said analogue multiplier means to be varied in magnitude by said analogue multiplier means to provide at the output of said analogue multiplier means said film speed correction control signal.

18. The camera of claims 2, 3, 4, 12, 13, or 16 wherein said illumination-indicating signal is fed to the first stage of said plurality of stages to be varied in magnitude by said multiplier means to provide said output signal so corrected for film speed.

19. The cameras of claims 1, 2, 3, 4, 12, 13 or 16 in combination with a cassette having displayed on the surface thereof a film speed representing code having said property.

20. The camera of claims 1, 2, 3, 4, 12, 13 or 16 wherein there are provided on said cassette five said specified areas, each having only a first and a second speed-indicating condition, and wherein said first and second speed-indicating conditions of said specified areas are in the form of two substantially different electrical conductivity values of the surfaces of said specified areas, and said sensing means include conductivity sensing means for providing two substantially different control signal conditions to control said multiplier means responsively to different conductivity sensings.

21. The camera of claims 1, 2, 3, 4, 12, 13 or 16 wherein there are provided on said cassette five said specified areas, and wherein said speed-indicating conditions of said specified areas are in the form of substantially different electrical conductivity values of the surfaces of said specified areas, and said sensing means include conductivity sensing means for providing substantially different control signal conditions to control said multiplier means responsively to different conductivity sensings.

* * * * *